Jan. 6, 1953     R. E. SELTZER     2,624,492
AGRICULTURAL MATERIAL SPREADER
Filed Nov. 1, 1949     2 SHEETS—SHEET 1
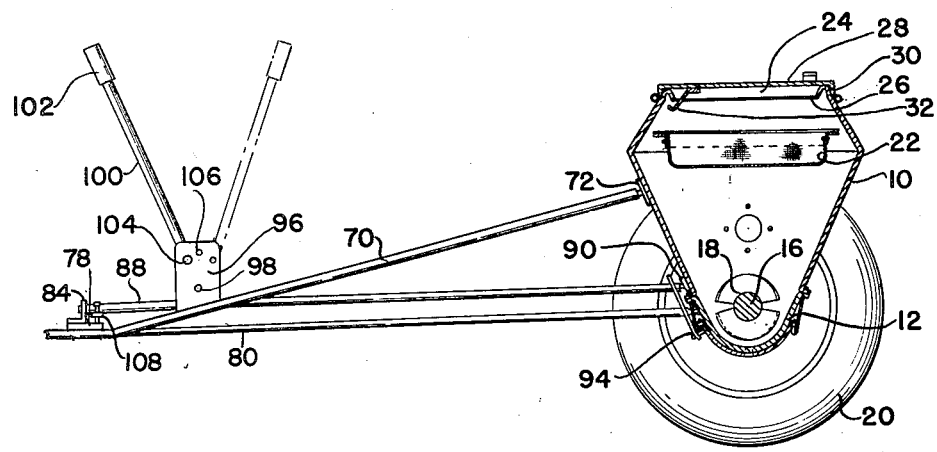
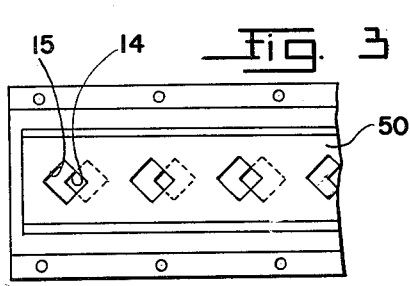
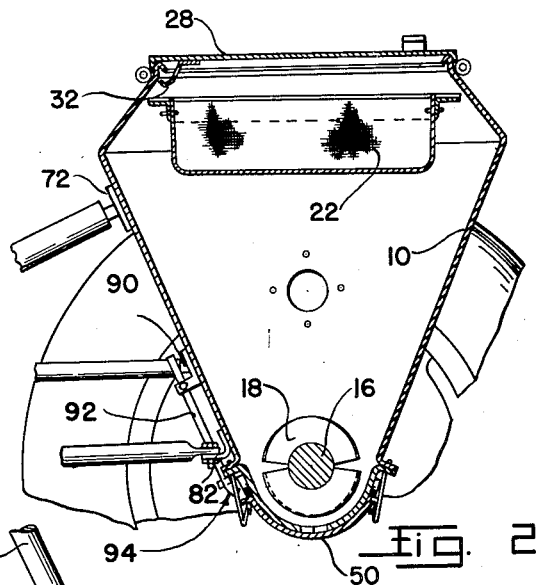
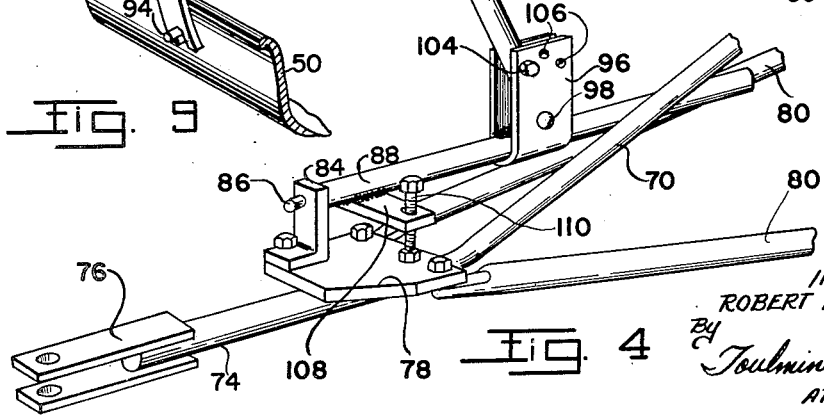
INVENTOR
ROBERT E. SELTZER
By
Toulmin & Toulmin
ATTORNEYS.

Jan. 6, 1953 R. E. SELTZER 2,624,492
AGRICULTURAL MATERIAL SPREADER
Filed Nov. 1, 1949 2 SHEETS—SHEET 2
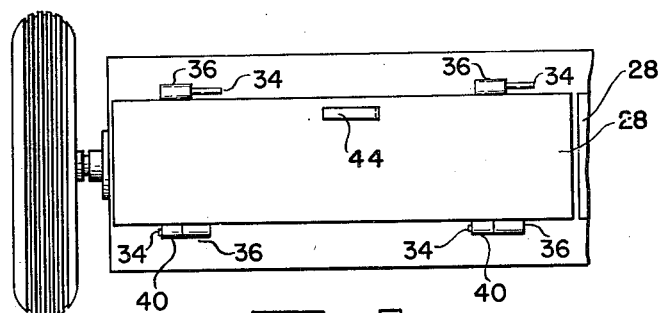
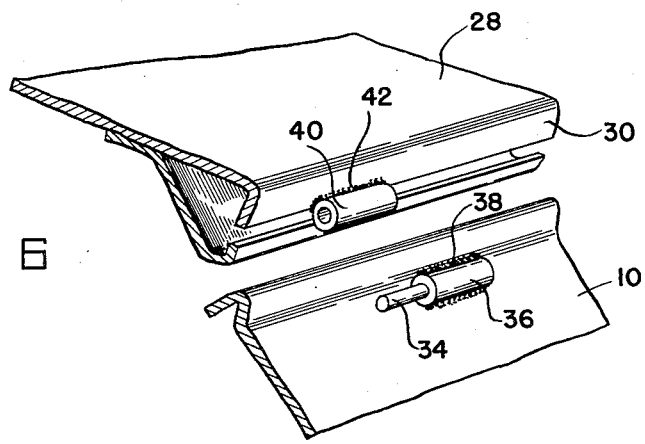
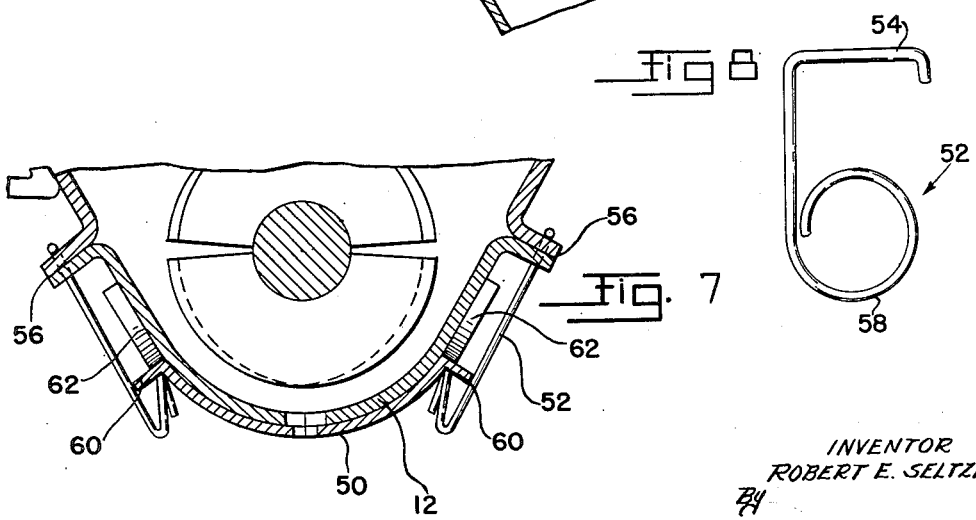
INVENTOR
ROBERT E. SELTZER
BY
Toulmin & Toulmin
ATTORNEYS Patented Jan. 6, 1953

2,624,492

UNITED STATES PATENT OFFICE 2,624,492

AGRICULTURAL MATERIAL SPREADER

Robert E. Seltzer, Bellevue, Ohio, assignor to The American Baler Company, Bellevue, Ohio, a corporation of Ohio Application November 1, 1949, Serial No. 124,749

6 Claims. (Cl. 222—177)

This invention relates to agricultural material spreaders and particularly to spreaders of the type utilized for distributing lime and dry fertilizers and the like. The instant application relates to a spreading device similar to that disclosed and claimed in my recently filed application, Serial No. 115,595 and filed September 14, 1949.

In the spreading device illustrated in the above identified copending application, certain difficulties were encountered in adapting the spreader to various uses. For example, the spreader was well adapted for connection with a tractor for spreading materials over relatively small areas, but was not adapted for being connected with a truck or the like for working over large areas where material was supplied from the truck to the hopper of the spreader. Among the difficulties encountered with the material spreader of the said application was that it was not convenient to adjust the regulating slide on the bottom of the hopper and the lid arrangement of the hopper was such that it was difficult to transfer the material from the truck into the hopper.

The instant invention has as its particular object, the provision of a material spreader of the type referred to in which the foregoing difficulties are eliminated.

Another object of this invention is to provide a material spreader of the type referred to which is adapted for connection with a tractor for working over relatively small areas or for connection with a supply truck for working over larger areas.

Another particular object of this invention is to provide a material spreader for connection behind a truck or tractor in which the controls for the regulating plate that determines the rate of discharge of material from the spreader are conveniently arranged for either truck or tractor operation of the spreader.

These and other objects and advantages will become more apparent upon reference to the following specification, taken in connection with the accompanying drawings, in which:

Figure 1 is a view looking in from the side of the spreader of this invention with the near wheel removed and with the hopper and agitator in section;

Figure 2 is a vertical section through the hopper and is drawn on a somewhat larger scale than is Figure 1;

Figure 3 is a view looking up from beneath the hopper and showing the discharge openings in the bottom of the hopper and the regulating plate by means of which the effective areas of said openings can be varied;

Figure 4 is a perspective view of the outer end of the hitch frame for the material spreader and showing the control mechanism for the adjustable slide plate;

Figure 5 is a plan view looking down on top of the hopper of the spreader and showing the hinge arrangement by virtue of which the lid for the hopper can be reversably supported thereon;

Figure 6 is a perspective view showing somewhat more in detail the hinge arrangement for connecting the lid and hopper;

Figure 7 is an enlarged sectional view taken through the bottom of the hopper showing the supporting springs for the slide plates and the guide blocks on the hopper for engaging the edges of the slide plate;

Figure 8 is a perspective view showing one of the slide plate supporting springs; and Figure 9 is a perspective view showing the connection of the adjusting rod to the arm that shifts the slide plate.

Referring to the drawings, the material spreader illustrated therein comprises a hopper 10 which tapers inwardly toward a rounded bottom part 12 having therein the spaced diamond shaped discharge opening 14. Agitator shaft 16 traverses the hopper on substantially the center line of the curved bottom part thereof and has thereon the agitator plates 18 by means of which the material in the hopper is maintained broken up, and is fed back and forth across the openings 14 thereby insuring a continuous and uniform supply thereto. Shaft 16 is connected in any suitable manner with one or both of the ground wheels 20 on which the hopper is supported.

The upper end of the hopper is adapted for receiving therein the screen 22 which serves to prevent foreign particles from entering the hopper, which particles might detract from the efficiency of operation of the spreader or even cause damage to the agitator mechanism.

The upper end of hopper 10 is open as at 24 and has a rolled in edge part 26 thereby presenting a very blunt periphery about the opening 24. Extending over opening 24 is a lid 28 having a turned down peripheral position 30 which closely embraces the upper portion of the hopper. Lid 28 has connected on its underneath side along one edge a cleat or stop member 32 adapted for engagement with the adjacent edge of the rolled in part 26 to provide a convenient stop for the said lid.

Reference to Figures 2, 5 and 6 will reveal that each side of the hopper mounts a hinged part comprising the pin 34 and the sleeve part 36 which supports the pin and which is welded, as at 38, to the said hopper.

The lid 28, on the other end, has a sleeve part 40 adapted for receiving pin 34 and welded to flange part 30 of the lid as indicated at 42. The hinged parts on the hopper are spaced therealong and arranged on both sides thereof as will be seen in Figure 5 and are so positioned that the lid 28 can be arranged to lift upwardly from the back of the hopper or from the front thereof.

In Figure 5 the lid is arranged to be raised upwardly from the rear by means of the handle 44 and it will be evident from this figure that the lid could be reversed so that it could be raised from the front. The advantage of an arrangement of this nature is that when the spreader is being drawn behind a truck, the lid can be raised up from the front and material shoveled directly from the truck into the hopper with the lid serving as a guard to prevent the material from being thrown completely over the hopper.

On the other hand, if the device is being drawn behind a tractor, it is more convenient for the lid to be raised from the rear for inspection of the contents or for supplying further material to the hopper.

Preferably, the hopper is divided into two compartments along its length and each has a lid 28. In Figure 5 one of the lids 28 is shown completely and the adjacent end of the other lid 28 will be seen at the right hand end of the view.

The rounded bottom part of hopper 12 is adapted for receiving regulating plate 50 which is retained in position against the bottom of the hopper by the spring members 52 which are illustrated in Figures 2 and 7 and in perspective, in Figure 8. Regulating plate 50 has diamond shaped apertures 15 spaced therealong at the same spacing as the discharge openings 14 in the bottom of hopper 10, whereby axial shifting of plate 50 will cause variable registration of the said openings.

Each spring 52 comprises an upper hook portion 54 adapted for engagement with the flanges 56 extending outwardly from the hopper adjacently to the rounded bottom part thereof, and coiled portions 58 adapted for engagement beneath the outwardly turned flanges 60 extending along the side edges of regulating plate 50.

The spring arrangement permits ready connection of the regulating plate to the bottom of the hopper but at the same time prevents rattling thereof, permits its easy shifting along the bottom of the hopper, and permits its easy removal when it is necessary to clean it or the bottom face of the hopper.

The regulating plate is slidably retained in position by the blocks 62 secured to the sides of the bottom part of the hopper and bearing on the flange 60 of the regulating plate as illustrated in Figure 7.

The hitch frame for the material spreader will best be seen in Figures 1, 2 and 4 and comprises a central bar or tube 70, detachably secured at its rear end to a bracket 72 outstanding from the front face of hopper 10 in about the middle thereof and adjacent to the top. Rod or tube 70 extends downwardly from bracket 72 and has a horizontal portion 74 which is secured between a pair of strap members forming a clevis connection 76 for connection with a tractor or truck or other suitable draft means.

Rearwardly from clevis 76, rod or tube 70 mounts a plate 78 which is preferably welded to tube 70 so as to be rigid therewith. Extending rearwardly and outwardly from plate 78 are rods or tubes 80 which connect with the face of the hopper adjacent to the ends thereof and near the bottom, by means of bracket members 82. The above described hitch arrangement is quite inexpensive, is light, but at the same time provides a highly adequate means for connecting the spreader with a draft means, and for supporting and guiding it during use.

Upstanding from plate 78 is a bracket 84 which receives pin 86 of a control tube or rod 88 that extends rearwardly to the face of hopper 10 and is journaled thereon on a bracket 90.

Adjacent to the rear end control rod or tube 88 is connected therewith a bar 92 that extends downwardly and into engagement with regulating slide 50 as indicated at 94 in Figures 1 and 2.

It will be evident that the rocking movement of rod or tube 88 about its connection with bracket 84 and bracket 90 will provide for axial shifting of regulator slide 50 along the bottom of hopper 10, thereby to vary the effective areas of discharge openings 14 by varying the registration of openings 15 in the regulator slide with the said discharge openings.

Adjacent to its connection with bracket 84, control rod 88 receives a U-shaped member 96 which is preferably welded to the control tube so as to be rigid therewith. A bolt 98 provides for a transverse pivot means in member 96 which receives the lower end of control lever 100.

Control lever 100 has a hand grip 102 at its upper end and is thus useful for rocking control tube 88 about its axis thereby to adjust the position of regulator slide 50. Lever 100 is adapted for being tilted about its pivot 98 to a plurality of different positions and is adapted for being clamped in these positions by clamp bolt 104 which can selectively be placed in any of a plurality of apertures 106 arranged in member 96 in the form of an arc about the axis of pivot bolt 98. In this manner lever 100 can be tilted forwardly for operation when the material spreader is being drawn behind a tractor and can be tilted backwardly when the spreader is connected with a truck thereby to prevent the said lever from interfering with the truck body.

Also adjacent to its connection with bracket 84, control rod or tube 88 has welded thereto, an arm 108 which adjustably receives a bolt 110 for abutment with plate 78.

Bolt 110, it will be evident, provides an adjustable stop for the control rod 88 and thereby is effective for predetermining the effective size of the discharge opening. Bolt 110 provides a very convenient means for adjusting the opening from the hitch end of the hitch frame thereby rendering it unnecessary in most cases to stop the spreader in order to accomplish this adjustment.

It will be evident from the foregoing that the material spreader as illustrated in the instant application is quite convenient to use in connection with either a truck or tractor, not only because of the improved hinge arrangement for the lid, but also because of the improved control arrangement for the regulator slide and conveniently located stop means therefor.

It will be understood that this invention is susceptible to modification in order to adapt it to different usages and conditions, and, accordingly, it is desired to comprehend such modifications

I claim:

1. In a spreader for granulated agricultural material; a hopper having discharge openings in the bottom, a slide plate resiliently mounted on the bottom of the hopper shiftable for varying the effective size of said openings, a hitch frame connected to one side of the hopper, constituting the front side thereof, and extending forwardly from the said front side, a rod extending parallel to the hitch frame, pivoted at the forward end to the forward end of the hitch frame and at the rear end to the front side of the hopper, means operatively connecting the rear end of said rod to said side plate so that rocking movement of said rod about its pivots will adjustably slide said slide plate longitudinally of the hopper, a lever upstanding from the forward end of said rod, a U-shaped bracket embracing said rod and pivotally receiving the lower end of said lever, a clamping screw traversing said bracket and lever for clamping the lever rigidly to said bracket, and said bracket having a plurality of other apertures therein for receiving said clamping screw to provide for a plurality of adjusted positions of said lever relative to said rod.

2. In a spreader for granulated materials; a hopper having a filling opening at the top with an upstanding rolled-in edge, a lid for closing said hopper having a dependent marginal flange to fit around said upstanding edge, separable hinge parts on one side of said lid and on both sides of said hopper for hingedly connecting the lid and hopper on either side of the hopper, said hinge parts being engageable and disengageable only when the lid is raised to disengage its flange from the upstanding edge of the hopper and stop means on said lid adapted for engagement with the rolled-in edge of the hopper for supporting the lid in open position in either of its positions of hinged connection with said hopper.

3. In a spreader for granulated material; a hopper having a filling opening in the top and discharge openings in the bottom; a hitch frame connected with the hopper and extending forwardly therefrom, means on the bottom of the hopper for adjusting the effective area of the discharge openings, an adjusting device for said last-mentioned means mounted on the hitch frame and including a rod extending along the hitch frame and journalled thereon, said rod being operatively connected to said means on the bottom of the hopper for adjusting the effective area of the discharge openings, a lever on said rod adjacent the front end of the frame, said lever being pivotally connected with said rod for movement thereon, in the plane of the rod, and means for securing said lever to said shaft in a plurality of adjusted positions about its pivotal connection therewith.

4. In a spreader for granulated agricultural materials; a hopper having discharge openings in the bottom, a regulator plate slidable on the bottom of the hopper, a hitch frame connected to the front side of said hopper and extending forwardly therefrom, an actuator rod journalled at one end on the front side of the hopper and at the other end on the forward end of the frame and connected to said regulator plate so rocking movement of the rod will shift the plate along the hopper to vary the effective area of said openings, an adjusting lever mounted on a transverse pivot on said rod adjacent its forward end for rocking the rod while being adjustable on the rod in the plane of the rod, a finger secured to said rod adjacent the said forward end, and a stop screw adjustably mounted in said finger for abutting the frame at a predetermined point of adjustment of said rod when the rod is turned in a direction to increase the size of said openings.

5. In a spreader for granulated agricultural material; a hopper having discharge openings in the bottom, a slide plate resiliently mounted on the bottom of the hopper shiftable axially therealong for varying the effective size of said openings, a hitch frame connected with the front side of the hopper and extending forwardly therefrom, a rod pivoted between the forward end of the hitch frame and the front side of said hopper and having an arm extending downwardly from the rear end with a slot in its lower end, a pin projecting from said plate into said slot, so rocking movements of said rod will adjust said plate, a bracket on the forward end of said rod, a lever pivoted to the bracket for movement in the plane of the rod, and means to clamp the lever to the bracket in a plurality of adjusted positions.

6. In a spreader for granulated agricultural materials; a hopper having a filling opening at the top with an upstanding peripheral edge, a lid normally closing said opening and having a dependent marginal flange to fit over said upstanding edge, and separable hinge parts on one side of said lid and on both sides of said hopper whereby said lid can be hinged to either side of said hopper for opening from the front or the back thereof, the hinge parts on one of said hopper and lid comprising sleeve elements extending parallel to the adjacent edge of the hopper, and the hinge parts on the other of said hopper and lid comprising pins receivable in said sleeves, said sleeves and pins being so positioned as to be engageable and disengageable only when the lid is in its fully open position.

ROBERT E. SELTZER.

REFERENCES CITED

The following references are of record in the file of this patent:

UNITED STATES PATENTS

| Number | Name | Date |
| --- | --- | --- |
| 36,883 | Towsen | Nov. 4, 1862 |
| 265,466 | Tibbits | Oct. 3, 1882 |
| 331,600 | Zeigler et al. | Dec. 1, 1885 |
| 479,936 | Foster | Aug. 2, 1892 |
| 505,480 | Pletcher | Sept. 26, 1893 |
| 1,008,200 | Sanders | Nov. 7, 1911 |
| 1,125,508 | Gaston et al. | Jan. 19, 1915 |
| 1,516,954 | Cole | Nov. 25, 1924 |
| 1,553,715 | Pender | Sept. 15, 1925 |
| 1,650,808 | Van Brunt | Nov. 29, 1927 |
| 2,008,200 | Forman | May 7, 1935 |
| 2,092,964 | Fernberg | Sept. 14, 1937 |
| 2,350,107 | Gandrud | May 30, 1944 |
| 2,510,231 | Zuzwiak | June 6, 1950 |